United States Patent
Khan et al.

(10) Patent No.: US 8,325,630 B2
(45) Date of Patent: Dec. 4, 2012

(54) DISTRIBUTED SPANNING TREE PROTOCOL ON A MULTI CHASSIS PORT CHANNEL

(75) Inventors: Tameen Khan, Santa Clara, CA (US); Ronak Desai, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 648 days.

(21) Appl. No.: 12/040,603

(22) Filed: Feb. 29, 2008

(65) Prior Publication Data

US 2009/0219836 A1  Sep. 3, 2009

(51) Int. Cl.
*H04L 12/28* (2006.01)
(52) U.S. Cl. ........ 370/256; 370/216; 370/219; 370/252; 370/255; 370/395.3; 709/221; 709/238; 710/311; 714/4.2
(58) Field of Classification Search .................. None
See application file for complete search history.

(56) References Cited

U.S. PATENT DOCUMENTS

| | | | |
|---|---|---|---|
| 2003/0097470 A1* | 5/2003 | Lapuh et al. | 709/239 |
| 2005/0063395 A1* | 3/2005 | Smith et al. | 370/399 |
| 2007/0005968 A1 | 1/2007 | Lu et al. | |

OTHER PUBLICATIONS

PCT International Search Report and Written Opinion dated Aug. 21, 2009.

* cited by examiner

*Primary Examiner* — Ayaz Sheikh
*Assistant Examiner* — Nicholas Sloms
(74) *Attorney, Agent, or Firm* — Patterson & Sheridan, LLP

(57) ABSTRACT

In one embodiment, a technique for routing traffic in networks represented by logical topologies, such as Multi Chassis Port Channel (MCPC) or Multi Chassis Ether Channel (MCEC) topologies, is provided. By modifying a port priority vector (PPV) to include an additional "Switch ID" field that identifies a designated bridge ID or a local switch ID, depending on whether the corresponding port is used as an MCT, a routing protocol designed to avoid loops in routing paths, such as STP, may avoid blocking MCT ports.

17 Claims, 14 Drawing Sheets

DISTRIBUTED SPANNING TREE PROTOCOL ON A MULTI CHASSIS PORT CHANNEL

TECHNICAL FIELD

Embodiments of the present disclosure generally relate to networking and, more particularly, to controlling the flow of network traffic.

BACKGROUND

A Multi Chassis Port Channel (MCPC) or Multi Chassis Ether Channel (MCEC) has two ends of a port channel termination on two different switches. These switches are commonly referred to as Aggregation Switches. Having multiple ends of a port channel terminate on different channels provides redundancy, not only across link failure, but also across a single switch failure.

In contrast, in a regular Port Channel, all links belonging to the Port Channel terminate on a single switch. The Port Channel is treated as a single logical link by Spanning Tree Protocol (STP), and any hardware operations like setting the port state or MAC flush/Age are applied on all member links of the Port Channel. As such, STP does not pose any issues on a regular Port Channel.

However, operating STP on an MCPC complex presents some challenges, as member links of the Port Channel are terminating on different switches. One of these challenges is that STP may block a port used to establish a multi-channel trunk (MCT) between MCPC switches. If an MCT port is blocked, the desirable redundancy offered by an MCPC topology may be lost.

Overview

One embodiment provides a method. The method generally includes maintaining a multi-chassis port channel (MCPC) priority vector for a port of a switch of an MCPC complex, wherein the MCPC priority vector includes a field whose value is determined based on whether or not the port is used to establish a multi-chassis trunk (MCT) in the MCPC and performing spanning tree protocol operations, based on the MCPC priority vector, to determine whether or not to allow forwarding on the port.

One embodiment provides a switching device. The switching device generally includes a first port for establishing a multi-chassis trunk (MCT) with another switching device for use in multi-chassis port channel (MCPC) communications, at least a second port for communicating with a device external to the MCPC, logic for maintaining a multi-chassis port channel (MCPC) priority vector for a port of a switch of an MCPC complex, wherein the MCPC priority vector includes a field whose value is determined based on whether or not the port is used to establish a multi-chassis trunk (MCT) in the MCPC, and logic for performing spanning tree protocol operations, based on the MCPC priority vector, to determine whether or not to allow forwarding on the port.

One embodiment provides a switching device. The switching device generally includes at least a first port for establishing a multi-chassis trunk (MCT) with another switching device for use in multi-chassis port channel (MCPC) communications, at least a second port for communicating with a device external to the MCPC, means for maintaining a multi-chassis port channel (MCPC) priority vector for a port of a switch of an MCPC complex, wherein the MCPC priority vector includes a field whose value is determined based on whether or not the port is used to establish a multi-chassis trunk (MCT) in the MCPC, and means for performing spanning tree protocol operations, based on the MCPC priority vector, to determine whether or not to allow forwarding on the port.

BRIEF DESCRIPTION OF THE DRAWINGS

So that features of the present disclosure can be understood in detail, a particular description of the disclosure may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION OF THE PREFERRED EMBODIMENTS

Embodiments of the present disclosure provide techniques for routing traffic in networks represented by logical topologies, such as Multi Chassis Port Channel (MCPC) or Multi Chassis Ether Channel (MCEC) topologies. By modifying a port priority vector (PPV) to include an additional "Switch ID" field that identifies a designated bridge ID or a local switch ID, depending on whether the corresponding port is used as an MCT, a routing protocol designed to avoid loops in routing paths, such as STP, may avoid blocking MCT ports.

An Example Network

Figure 1:
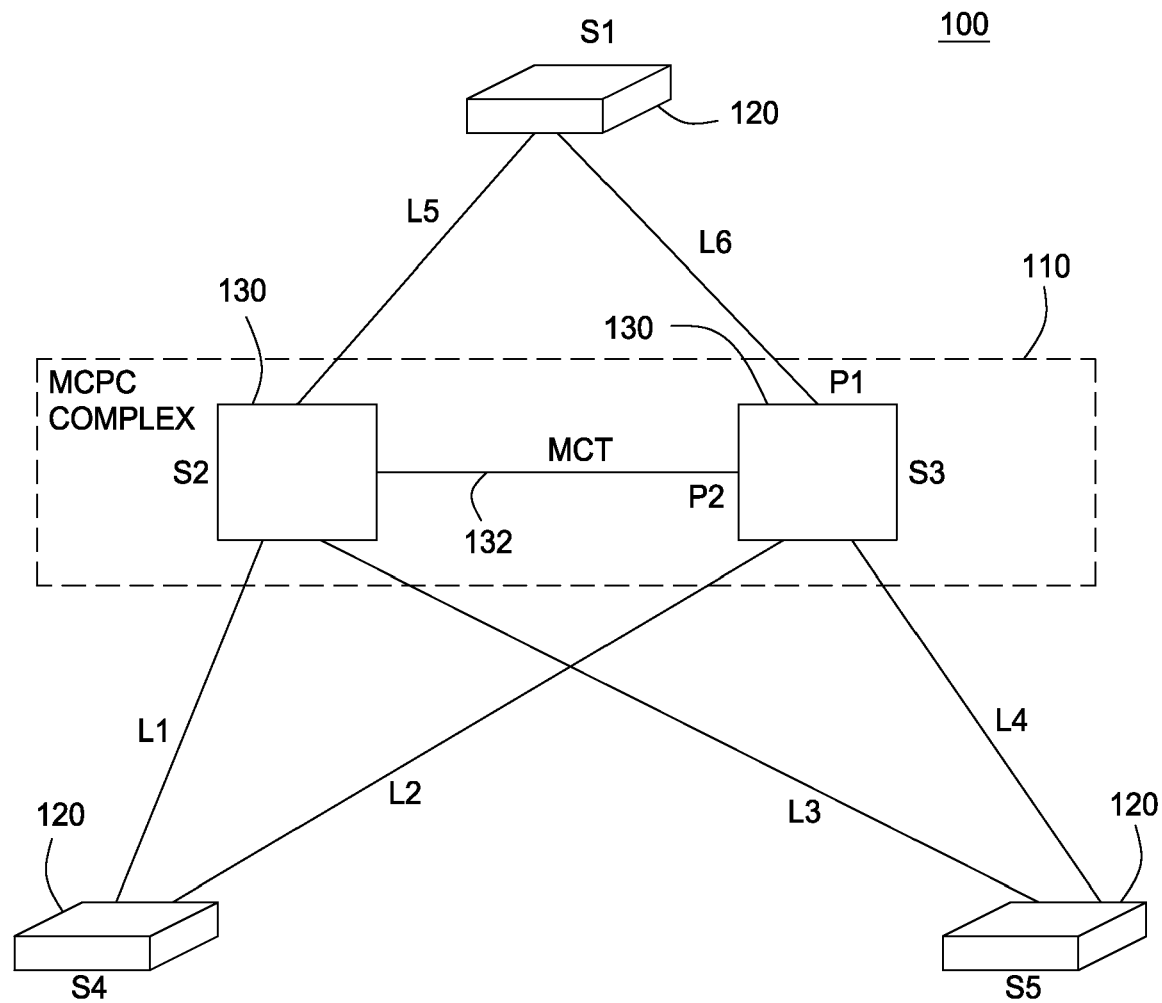
FIG. 1 illustrates a physical view of a network with an MCPC complex, according to one embodiment of the present disclosure.

FIG. 1 illustrates a physical representation of a network in which techniques provided in the present disclosure may be utilized. The network includes a first arrangement of switches 120 (S1, S4, and S5), interconnected via a second arrangement of switches 130 (S2 and S3).

As illustrated, S2 and S3 may be connected, via a multi-chassis trunk 132, to form an MCPC complex 110. Each switch in the MCPC complex 110 may participate independently in data forwarding. Because S1, S4, and S5 all have a physical link to each of the switches S2 and S3, the MCPC 110 provides redundant paths for traffic between S1, S4, and S5.

Figure 2:
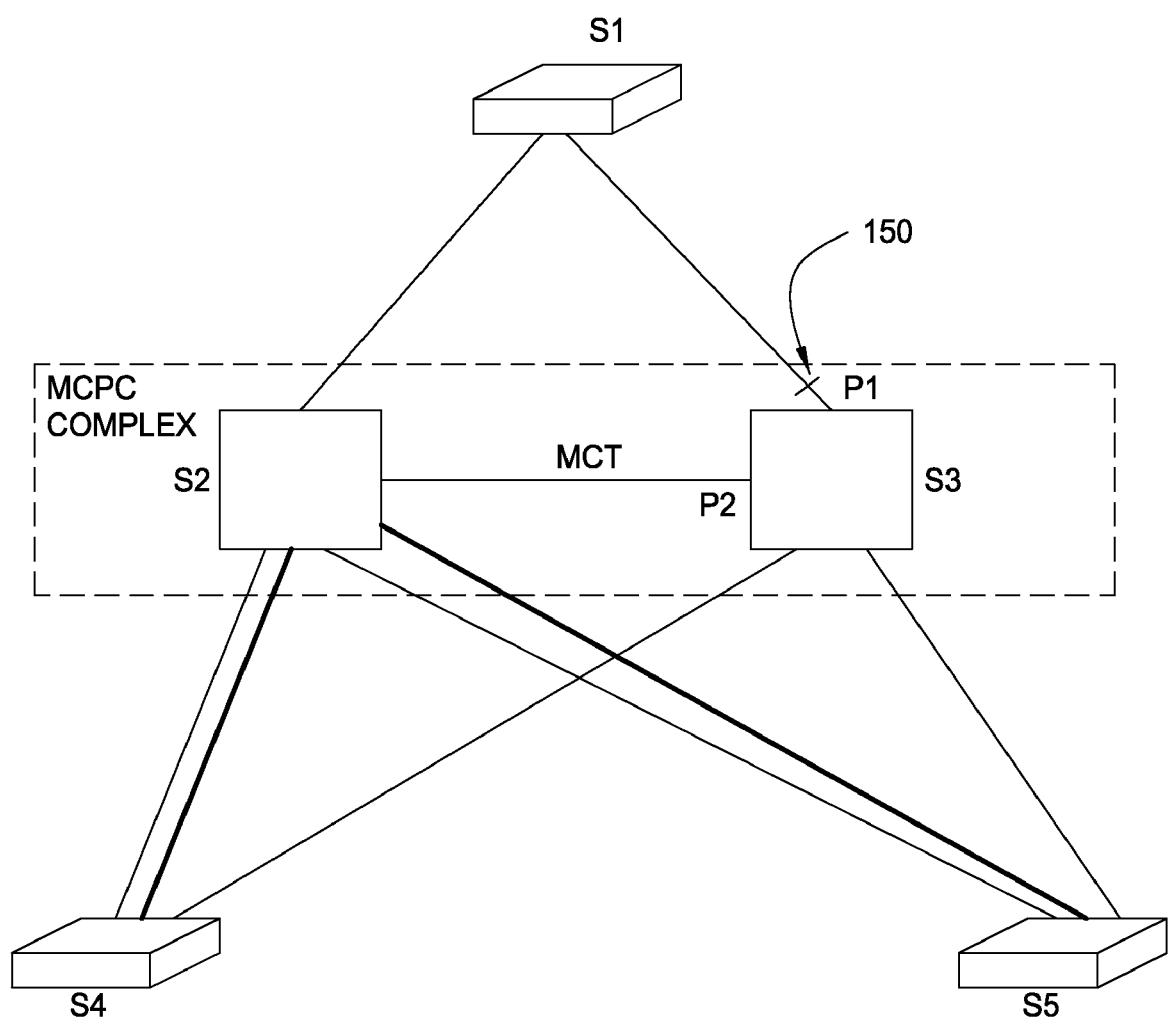
FIG. 2 illustrates a logical view of the network of FIG. 1, according to one embodiment of the present disclosure.

As illustrated in FIG. 2, logical MCPC ports MCPC1 and MCPC2 are formed between S4 and S5, respectively, and MCPC 110. Although each MCPC port terminates on both MCPC switches, each MCPC port appears as a single logical link for STP purposes.

In the illustrated example, it is assumed that S2 owns the MCPC, meaning that traffic on logical ports MCPC1 and MCPC2 will be routed through S2. As such, S2 may regularly synchronize MCPC parameters to S3 via the MCT connection. This regular synchronization may allow S3 to seamlessly take over control (ownership) of the MCPC in the event that S2 fails. Configuration parameters, as well as runtime parameters associated with the MCPC, may be synchronized to facilitate this switchover.

It may be desirable to run the STP protocol on the illustrated MCPC network topology, for example, to allow efficient routing and prevent undesirable loops. Unfortunately, conventional application of the STP protocol to an MCPC may result in blocking of ports used to establish the MCT between the MCPC switches. The present disclosure presents a technique to allow STP computations, while still maintaining MCT link forwarding.

In other words, as illustrated in FIG. 2, the techniques presented herein may allow STP operations to be run that result in the blocking of port P1 of S3 rather than the blocking of port P2, which would prevent MCT link forwarding. Thus, the techniques presented herein may provide the advantages of both MCPC (redundancy in the event of physical link and/or switch failure) and STP. Further, blocking P2 would be insufficient to prevent loops, as traffic could still be routed between S4 to S1 via the secondary MCPC1 connection with S3.

Embodiments of the present disclosure may facilitate the running of STP on MCPC networks by utilizing a modified form of an STP port priority vector (PPV), referred to herein as an MCPC PPV. The MCPC PPV may include an additional field whose value may be determined based on whether or not the corresponding port is used for MCT. The format for a conventional PPV is as follows:

conventional PPV={RootBridgeID: RootPathCost: DesignatedBridgeID: DesignatedPortID: BridgePortID}

The MCPc PPV includes an additional field (SwitchID), for example, as shown:

MCPC PPV={RootBridgeID: SwitchID: RootPathCost: DesignatedBridgeID: DesignatedPortID: BridgePortID}

The value of the Switch ID field may be determined based on whether the corresponding port is used for an MCT link. For example, if the port is used for an MCT link Switch ID may be set to the DesignatedBridgeID. If the port is not used for an MCT link the SwitchID may be set to the Local Switch ID. In other words:

SwitchID=DesignatedBridgeID (for MCT ports)
SwitchID=LocalSwitchID (for non-MCT ports)

As will be described in greater detail below, instances of STP running on MCPC switches may utilize this modified PPV value may be used to prevent blocking an MCT port.

Figure 3:
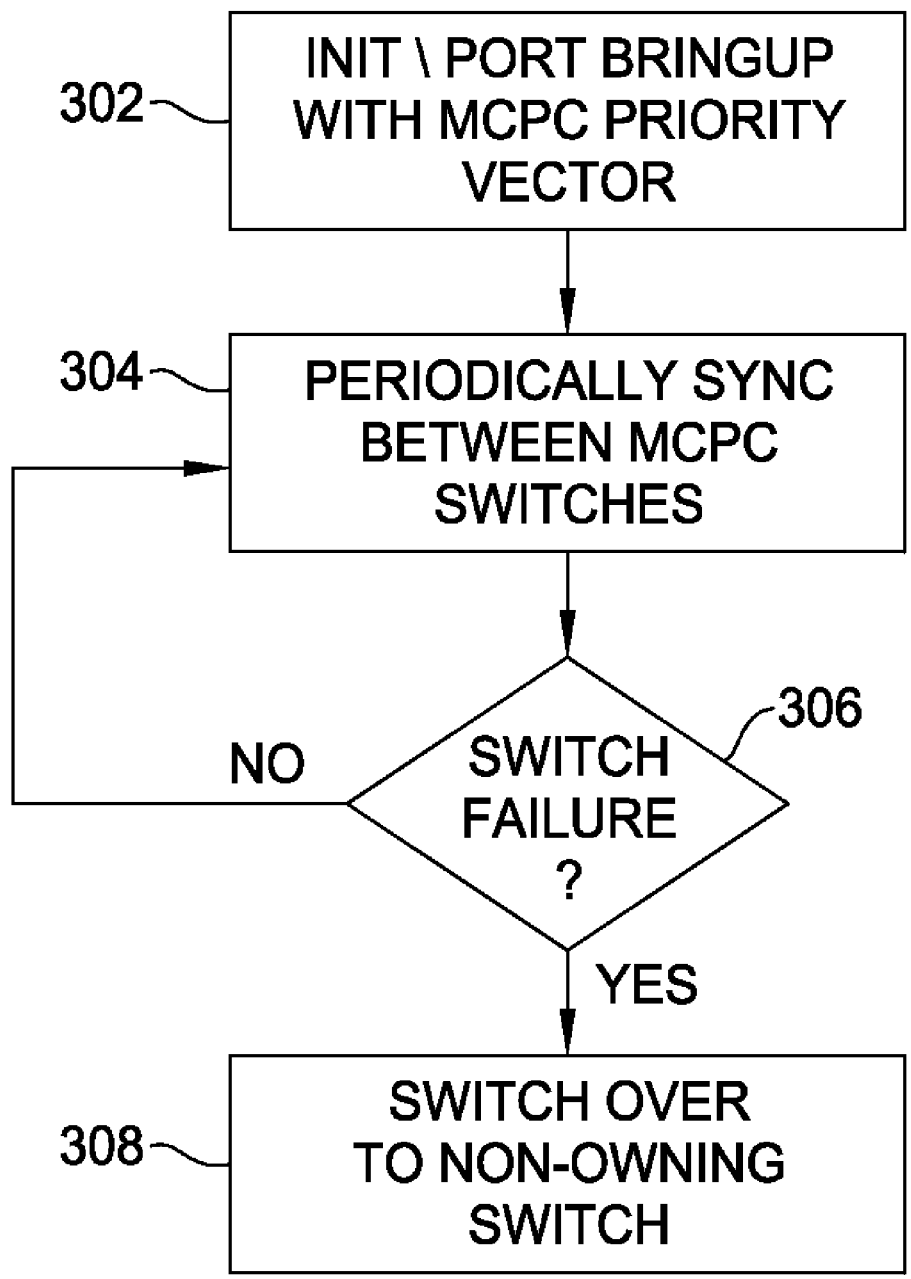
FIG. 3 is a flowchart of example operations, according to one embodiment of the present disclosure

FIG. 3 illustrates example operations 300 for performing STP on an MCPC topology in accordance with embodiments of the present disclosure. The operations 300 begin, at 302, by performing an initialization ("Port Bringup") using an MCPC PPV. MCPC parameters may be periodically synchronized between MCPC switches, at 304. If a switch (or link failure) is detected, at 306, a switchover to a non-owning switch occurs, at 308.

Figure 4A:
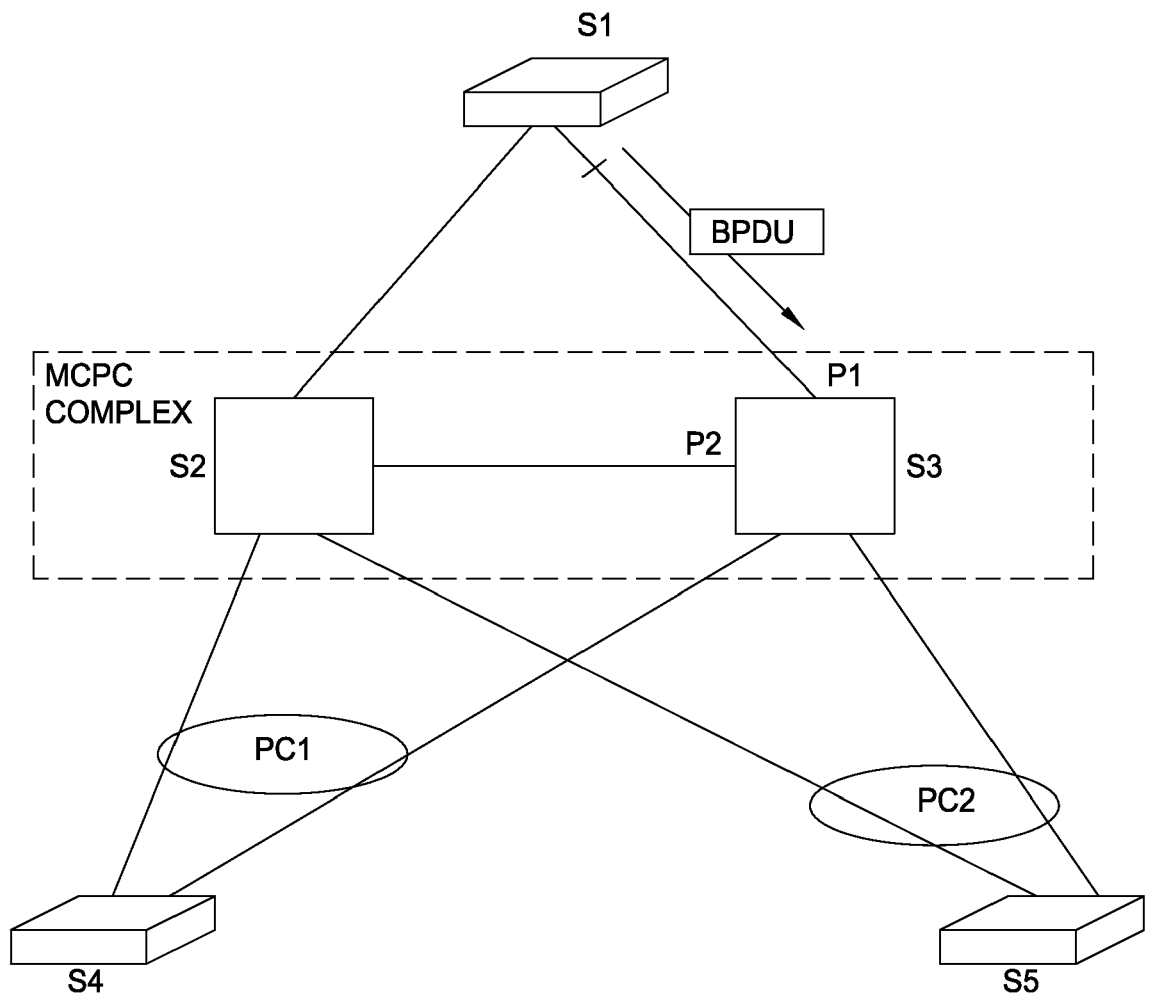
FIGS. 4A-4E illustrate configuration STP operations in an MCPC complex, according to one embodiment of the present disclosure.

FIGS. 4A-4E illustrate example initialization operations using an MCPC PPV (e.g., operation 302 of FIG. 3). As illustrated in FIG. 4A, S1 may send a Bridge Protocol Data Unit (BPDU). A BPDU is an STP "hello" packet that is typically sent out at configurable intervals to exchange information among bridges in the network.

In an initialized state, all ports may be blocked, with ports transitioning to unblocked states that allow forwarding as STP is run and converges. The BPDU packet sent from S1 may include a proposal bit set to change a port that is currently blocking to forwarding, for example, to establish a path between S3 and S1. Upon receiving the proposal, before sending back an agreement to S1, S3 may synchronize port P2.

Figure 4B:
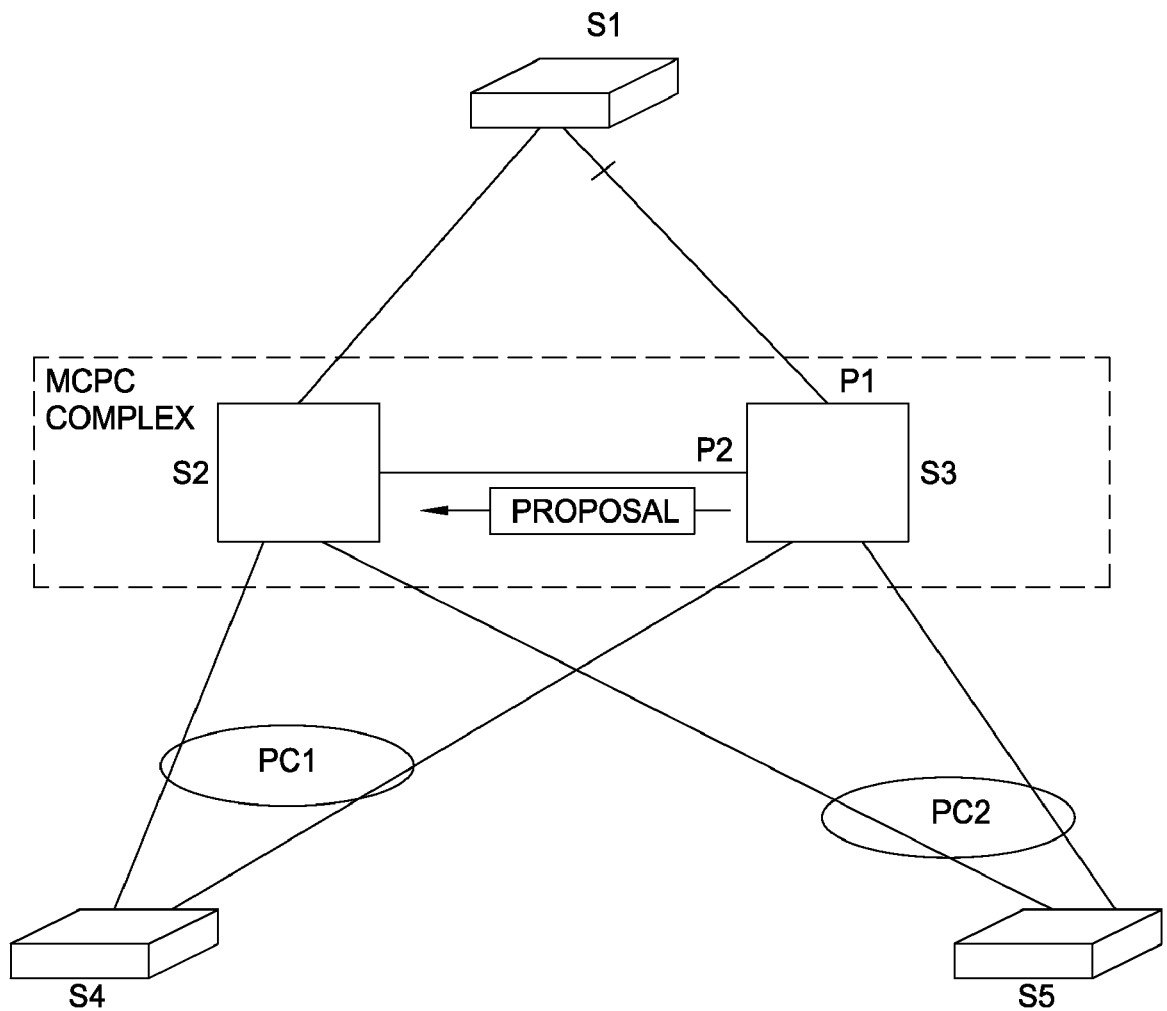

For example, as illustrated in FIG. 4B, S3 may send out a proposal message on P2 (to allow forwarding on P2). This proposal message may include modified port priority vectors (MCPC PPVs) for P1 and P2 as follows:

MCPC PPV (P1)={Root ID=S1: SwitchID=S3: Cost=1: Designated Bridge ID=S1}
MCPC PPV (P2)={Root ID=S1: SwitchID=S2: Cost=2: Designated Bridge ID=S2}

In this example, because the port P2 is utilized in MCT, the Switch ID field for the PPV for P2 may be set to the DesignateBridgeID (S2 in this example). The PPV for P1, on the other hand, that is not involved in MCT, may be set to the Local Switch ID (S3).

Internal logic running STP on the MCPC switches may determine the difference in the local switch ID and the Switch ID field is an indication that the corresponding port (P2) is used in MCT. Conversely, the internal logic may determine the same values of the local switch ID and the Switch ID field is an indication that the corresponding port (P1) is not used in MCT. Based on these determination, this logic may select the role for port P2 to be the root port and select the role for port P1 to be Alternate, despite the higher root cost associated with port P2 relative to port P1 (2 versus 1).

Figure 4C:
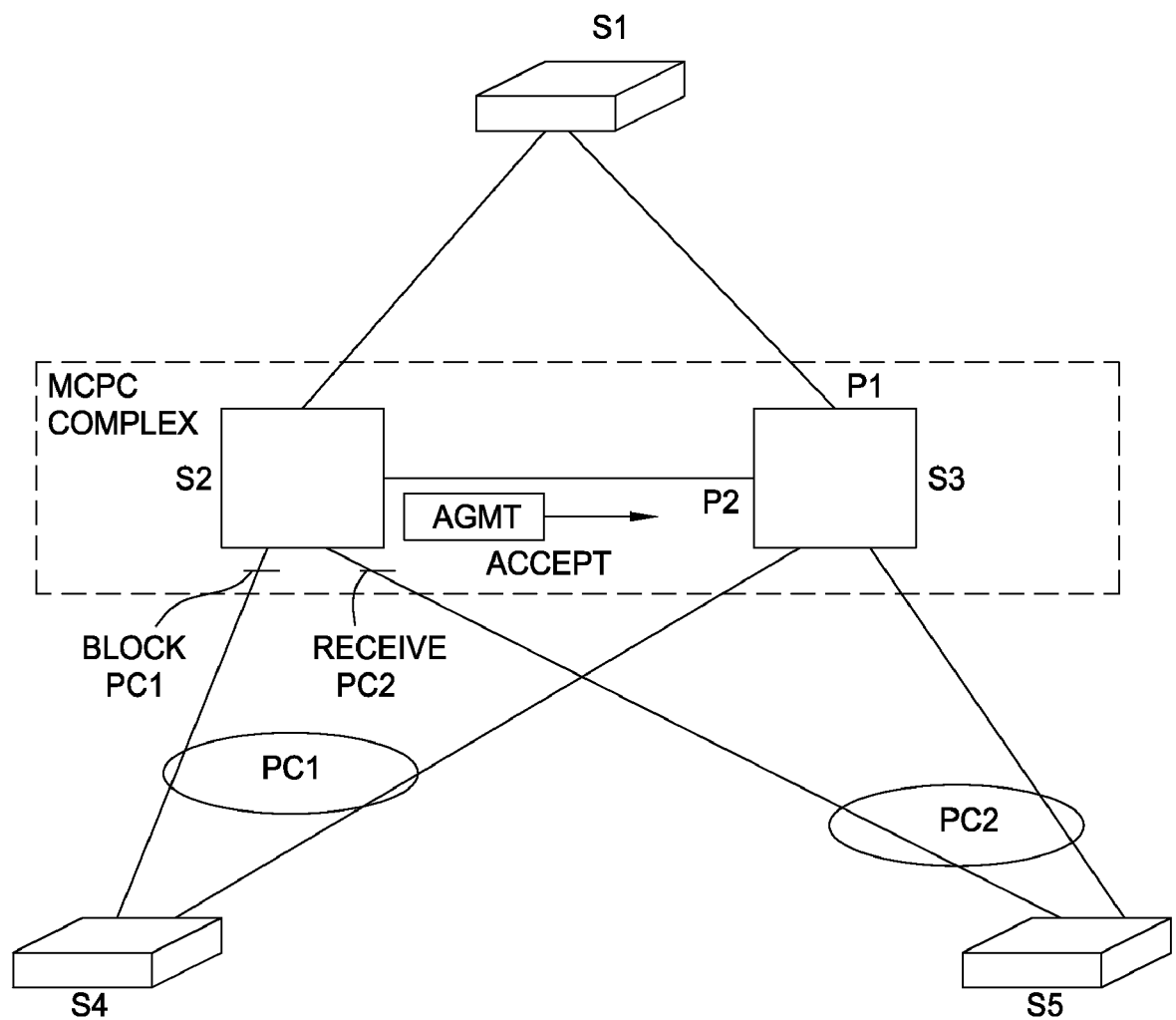
Figure 4D:
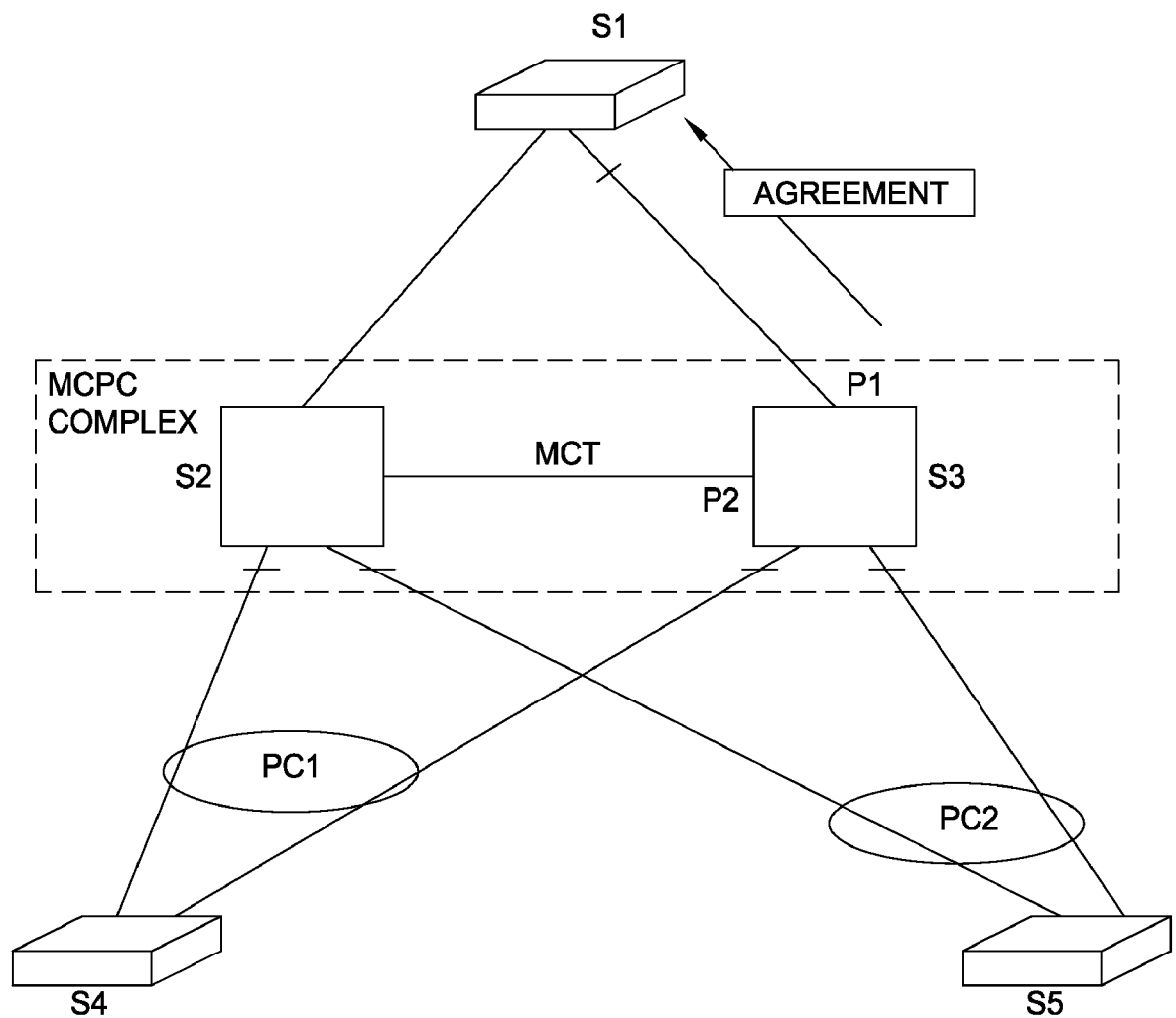
Figure 4E:
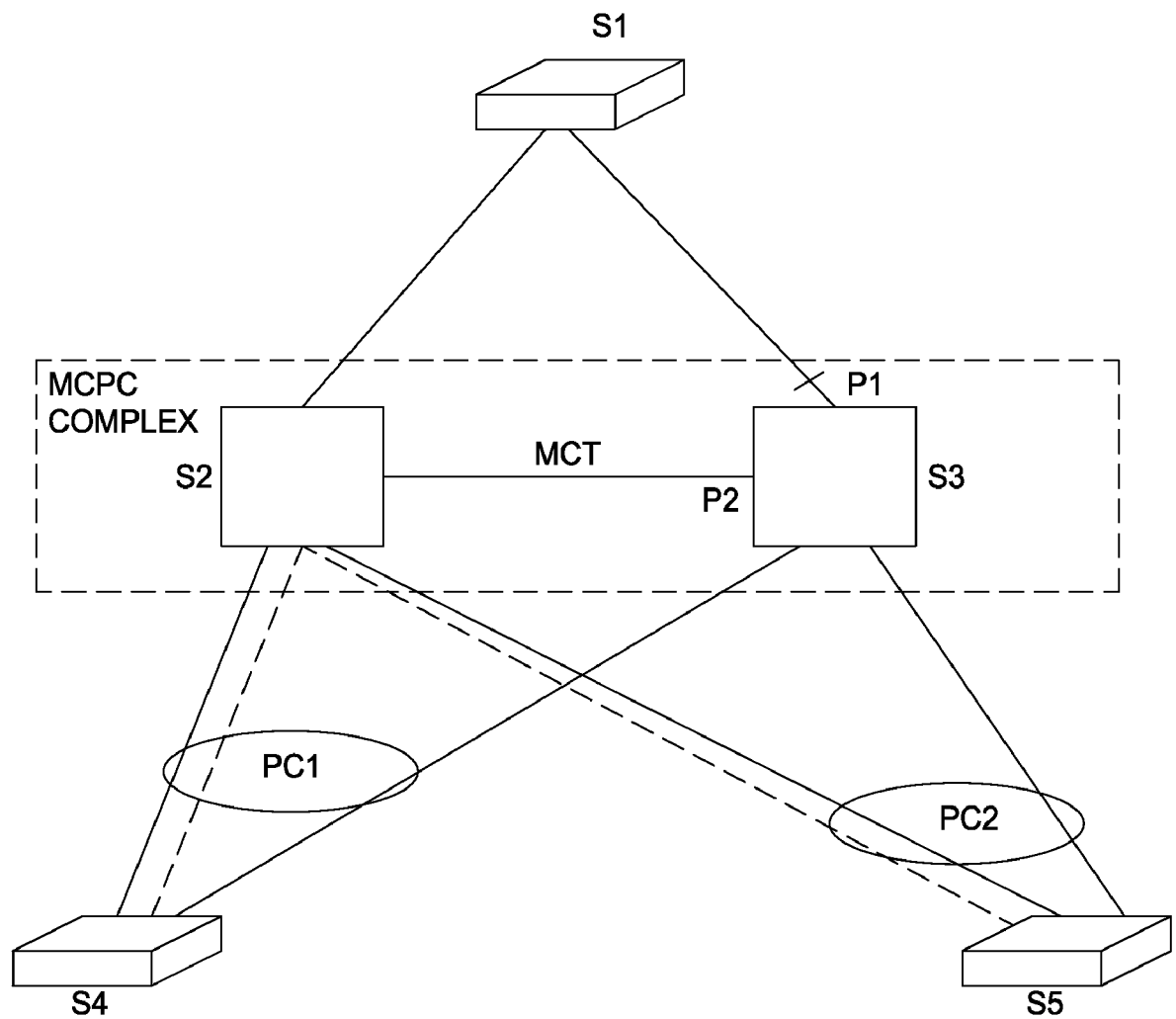

As illustrated in FIG. 4C, S2 may block the MCPC1 ports and send an agreement back to S3. As illustrated in FIG. 4D, upon receiving the agreement from S2, S3 may send an agreement back to S1, accepting S1's proposal to make its blocking port forwarding. Upon receiving the Agreement from S3, S1 unblocks its port, making its port Forwarding. A final "converged" state is shown in FIG. 4E, with port P1 of S3 blocking and the MCPC ports unblocked. By blocking port P1 of S3, an unwanted loop through S3 that would have been created through the alternate MCPC1 connection (between S4 and S3) is prevented.

As previously described, the MCPC switches S2 and S3 may periodically synchronize parameters allowing S3 to take over control of the MCPC in the event of a switch failure to S2 or a link failure. Communications, on the MCT established between S2 and S3 may be accomplished utilizing an internal protocol (VSL INBAND) with messages encapsulated with a header (e.g., a DBUS header). For communications between the MCPC switches, there is no need to strip off this header, but for external communications, the DBUS header may be stripped.

BPDU Handling on MCPC

To maintain current spanning trees, devices running STP periodically exchange BPDUs. In the case of MCPC topologies running STP, BPDUs may need to be transmitted, not only between the MCPC switches, but also on the logical ports (MCPC1 and MCPC2). However, to prevent confusion, it may be desirable to transmit BPDUs for a logical port on the same physical link each time.

Figure 5A:
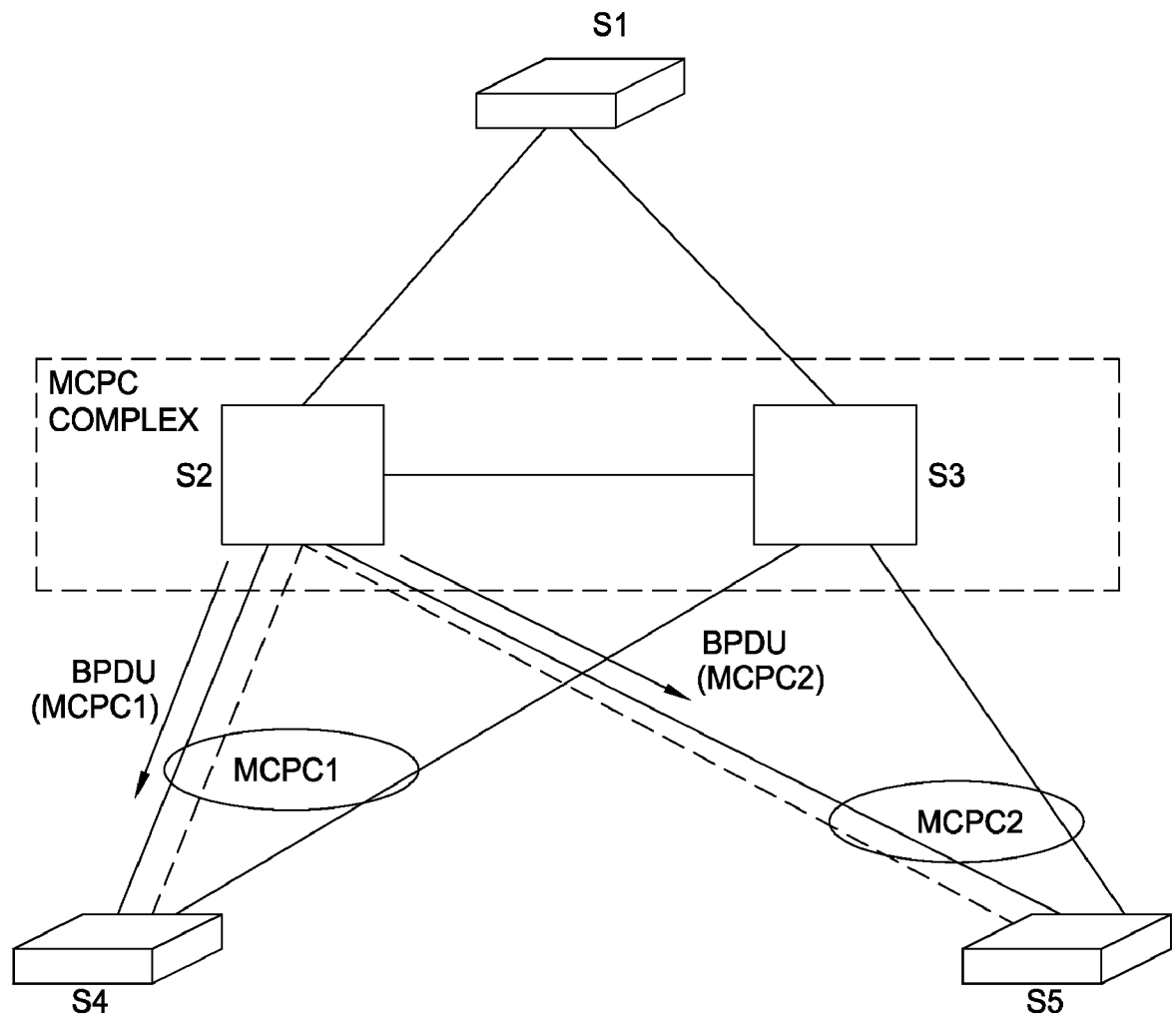
FIGS. 5A-5B illustrate the routing of BPDUs sent from an MCPC complex, according to one embodiment of the present disclosure.

For example, as illustrated in FIG. 5A, BPDUs for MCPC1 may always be sent on the physical link between S2 and S4, while BPDUs for MCPC2 may always be sent on the physical link between S2 and S5. Using the same physical interface each time may prevent confusion, for example, by allowing a Packet Manager to get the same selection value (such as a hash value) on a port channel for BPDU Tx when querying an interface database. The same selection value may help guarantee the same port channel member will be selected.

Figure 5B:
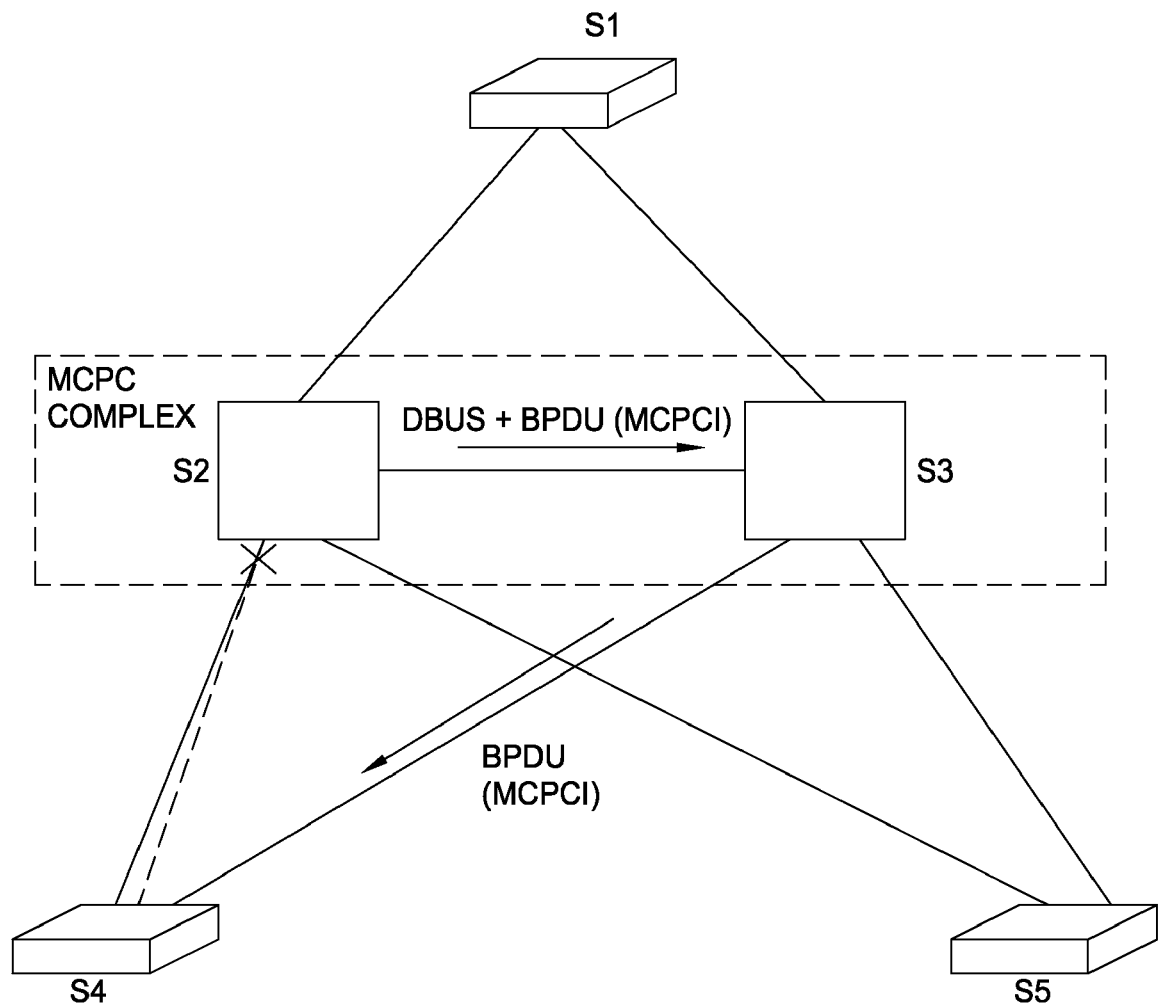

STP logic on S2 may send a BPDU to MCPC1 using some type of packet manager API. This logic may query an interface database and set values of a DBUS header for the MCPC1 destined BPDU (S2 as the source index and MCPC1 as the destination index). If these header values result in the selection of the port linking S2 to S4, the DBUS header may be stripped and the BDPU sent to S4 as shown in FIG. 5A. If for some reason the port linking S2 and S4 is down, however, the BPDU may be forwarded out on the MCT port, as illustrated in FIG. 5B. S3 may receive the BPDU packet (with the DBUS header), strip the DBUS header, and send the MCPC1 BDPU to S4.

For BPDUs transmitted between the MCPC switches on the MCT, internal source and destination indexes may be utilized in DBUS headers. For example, STP logic on S2 may send a BPDU on its MCT port, with a DBUS header having a source index (e.g., "S2_SUP") used to indicate the BPDU came on the local MCT port. The DBUS header may also include a destination index (e.g., "S3_SUP") to ensure the message will be routed correctly on S3. To allow this approach of BPDU transport over the MCT, Destination indexes may be unique across the MCPC switches.

Figure 6A:
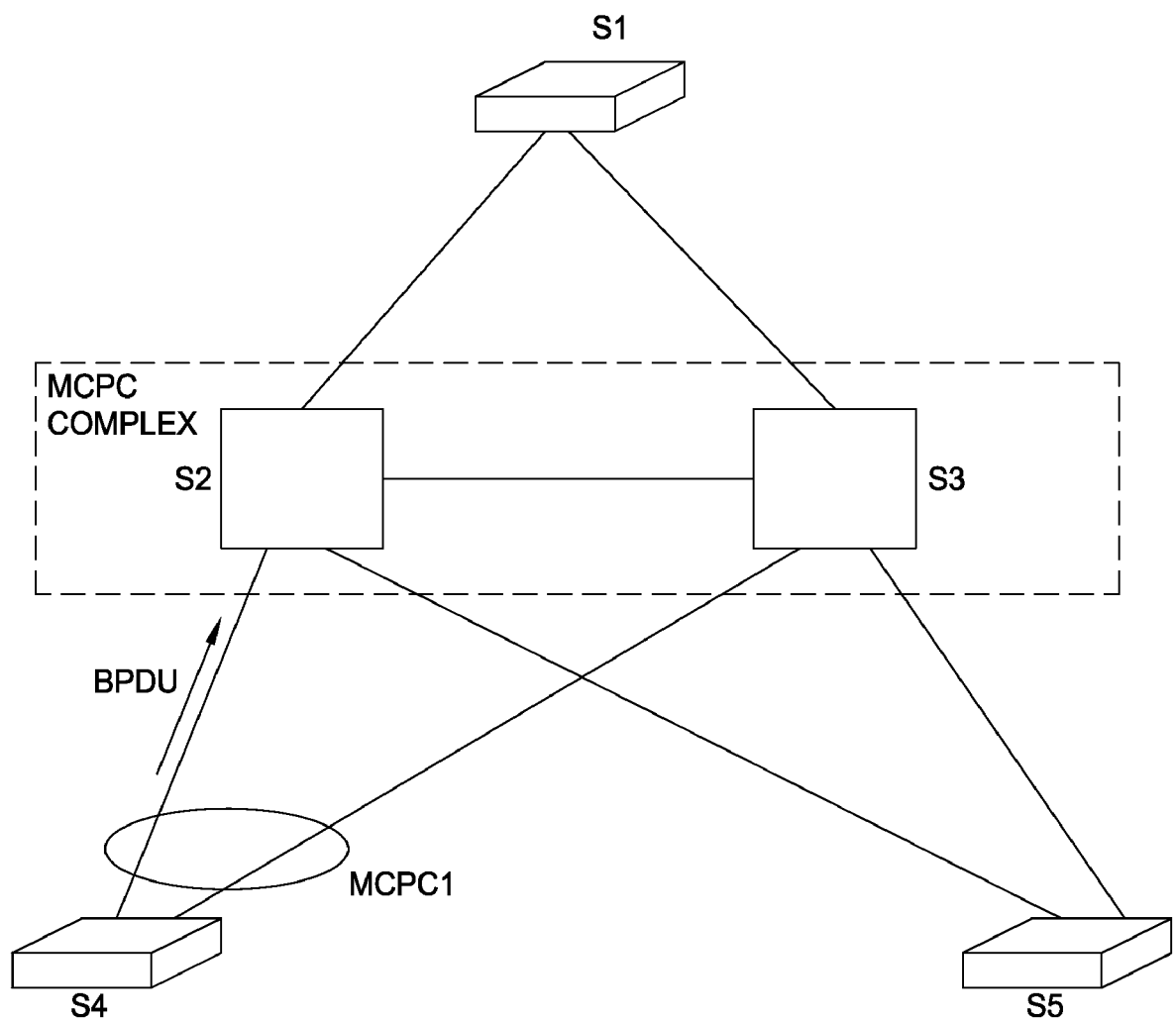
FIGS. 6A-6B illustrate the routing of BPDUs sent to an MCPC, according to one embodiment of the present disclosure.
Figure 6B:
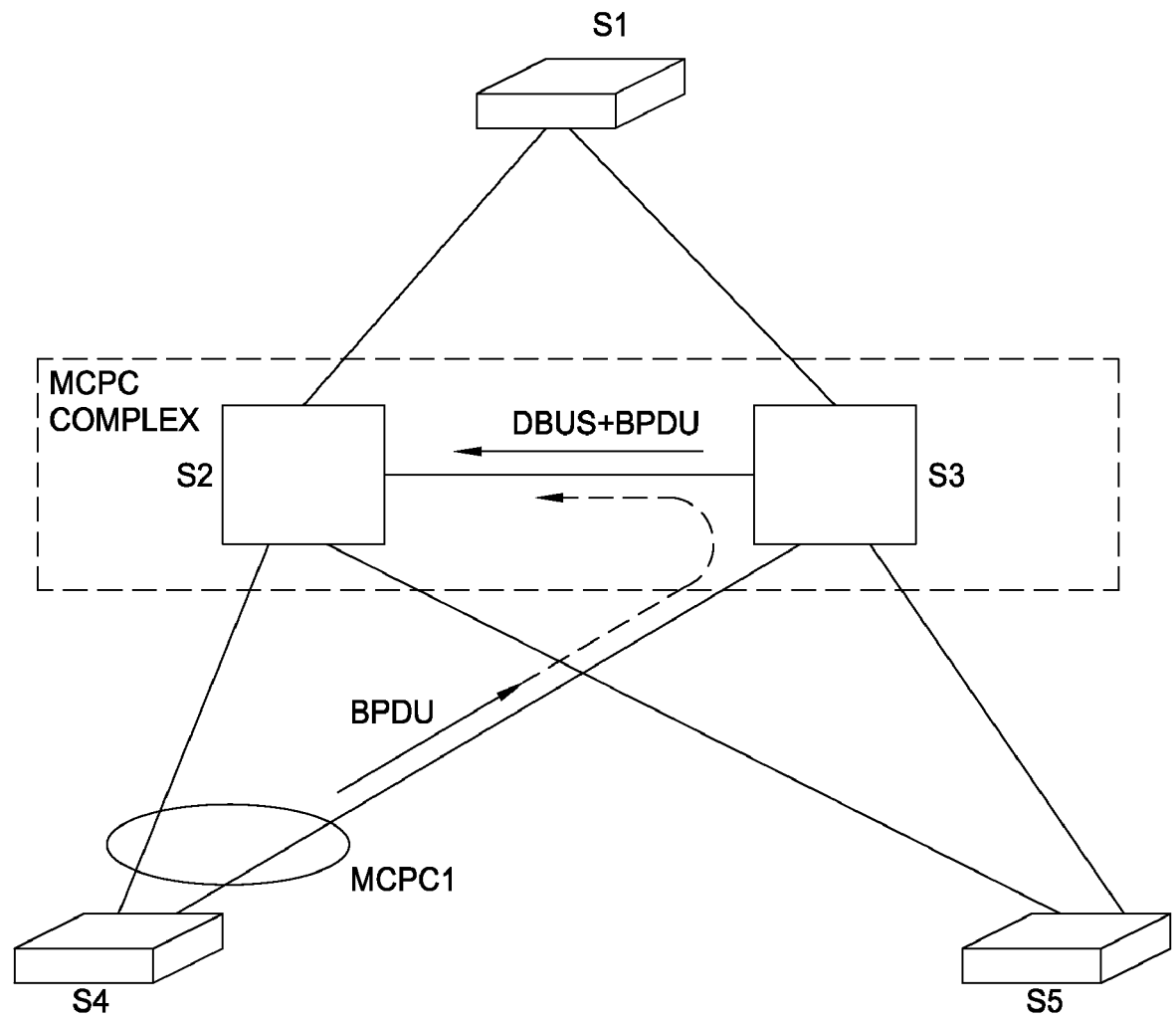

FIGS. 6A-6B illustrate example handling of BPDUs received by the MCPC. As illustrated in FIG. 6A, the MCPC may receive a BPDU on port P3 of S3. This BPDU should be delivered to STP logic running on S2 as having been received on the logical port MCPC1. To accomplish this, logic for port P3 may set the source index to MCPC1, which may cause the BPDU to be routed to internal S2 logic (e.g., destination S2_SUP). A packet manager for the logical port on S2_SUP may deliver the BPDU to STP logic as being received on MCPC1, thereby allowing STP to operate as a single chassis port channel.

When the MCPC receives a BPDU on a switch that does not have ownership, the BPDU may be relayed to the peer switch that does have ownership with the source index preserved. As illustrated in FIG. 6B, still assuming S2 owns MCPC1, a BPDU received via an alternate link (e.g., received on port P4 of S3) should eventually be delivered to S2 (DBUS+BPDU) as having been received on MCPC1. In this case, when the BPDU is received on P4 of S3, port logic may realize that MCPC1 is owned by S2 and forward the BPDU on the MCT. The BPDU may be forwarded with a DBUS header indicating MCPC1 as the Source index and S1_SUP as the destination index. As a result, upon receiving this BPDU, logic on S2 may forward it to STP logic as being received on MCPC1.

As illustrated above in FIG. 5B, in the event of a link failure, the MCPC may transmit BPDUs utilizing the alternate physical link allowing the MCPC to continue to operate. In the event of a switch failure, the MCPC may also continue to operate with the peer switch taking over ownership.

Figure 7A:
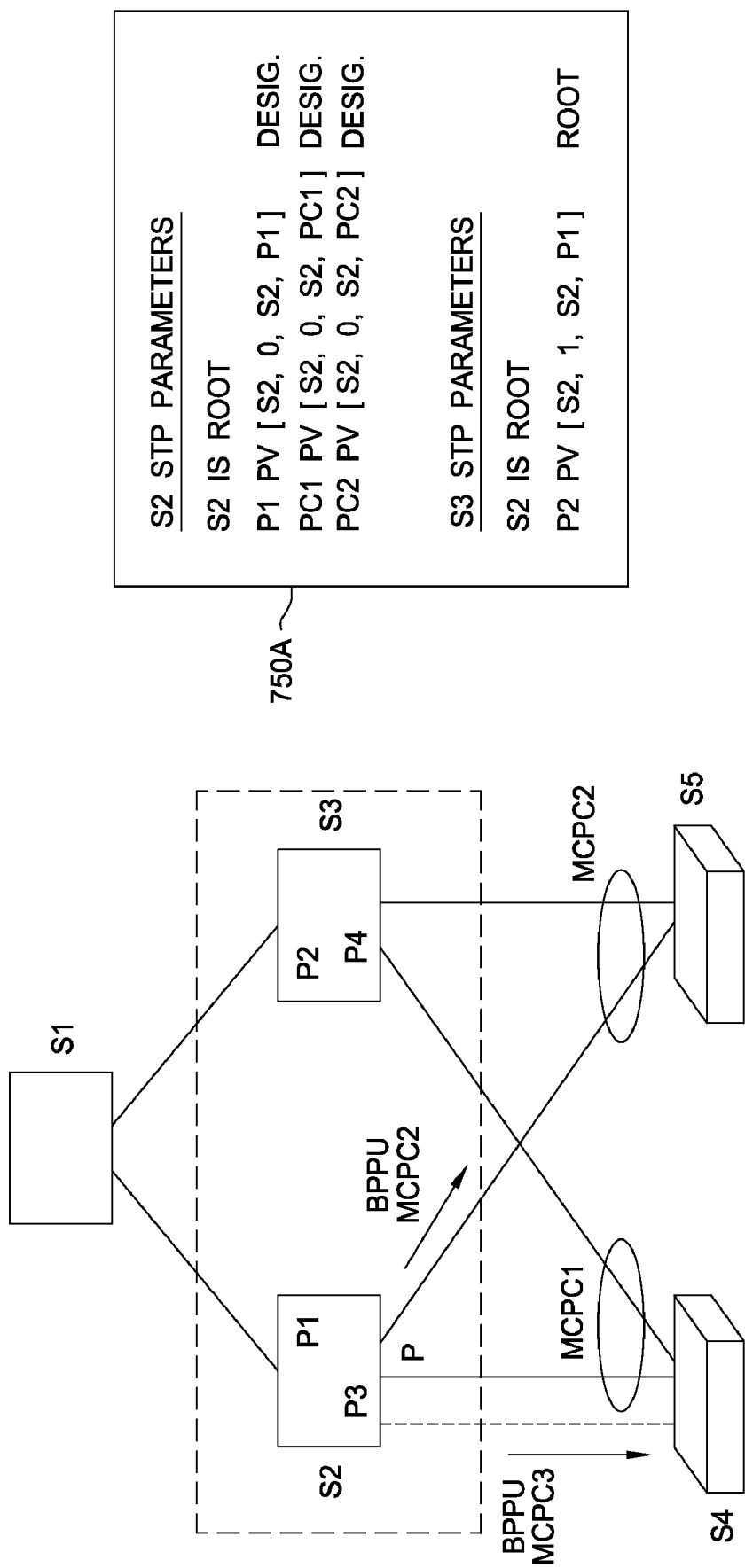
FIGS. 7A-7B illustrate link and switch failure handling, according to one embodiment of the present disclosure.
Figure 7B:
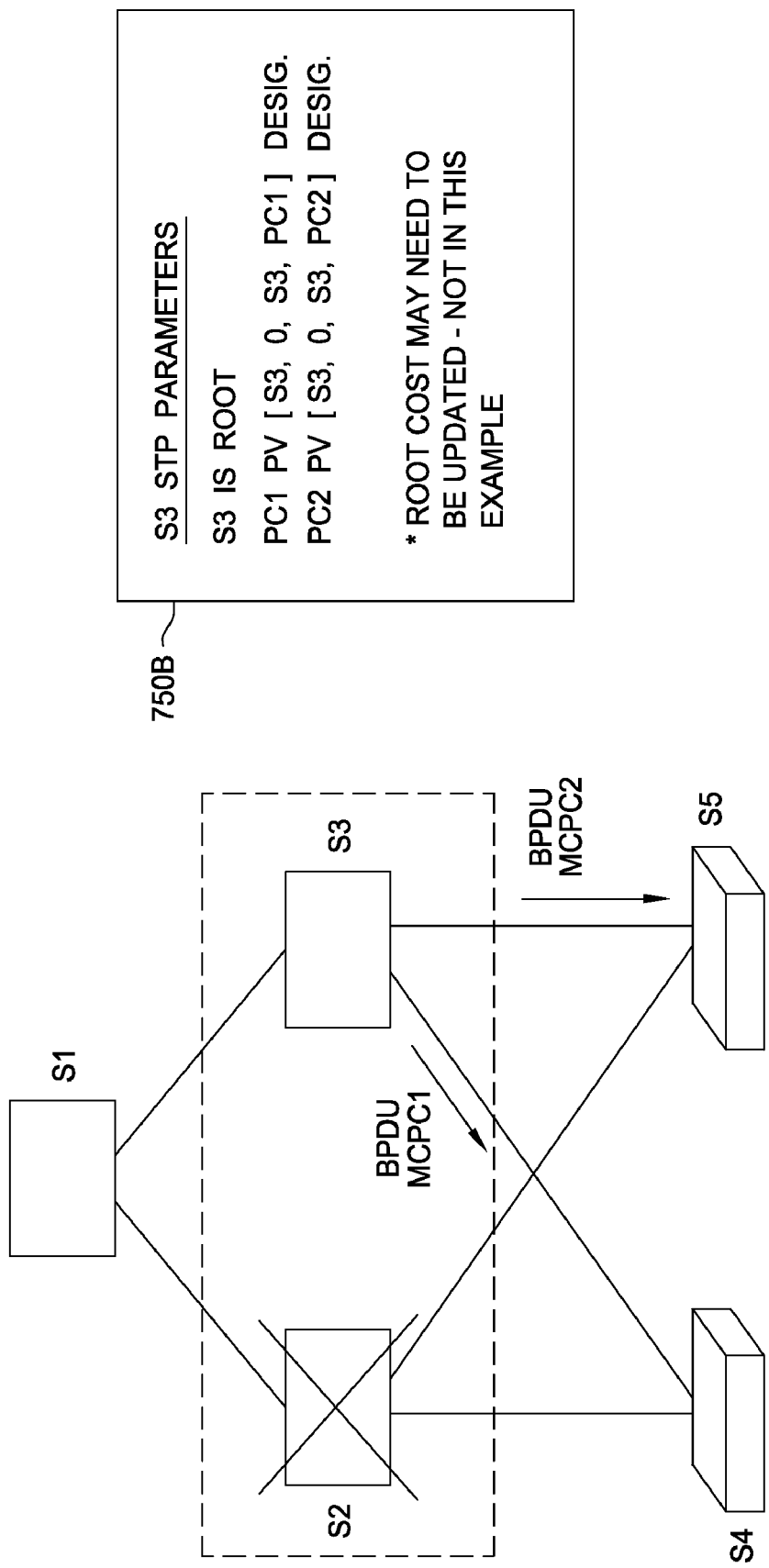

FIGS. 7A and 7B illustrate a switchover to a non-owning switch in the event of a failure of an owning switch. As illustrated in FIG. 7A, as long as the owning-switch is active, BPDUs for both MCPC1 and MCPC2 may be sent by the owning switch. The current STP parameters for the illustrated example with S2 active are listed in table 750A, with S2 designated as a root and, for switch S3, port p2 is designated as a root port (despite a higher cost than the port directly connected to S1).

As illustrated in FIG. 7B, once switch S2 fails, S3 will take over ownership and begin sending BPDUs for both MCPC1 and MCPC2. The STP parameters are updated to reflect this change in ownership. These updated STP parameters for S3 are shown in table 750B, with S3 designated as the root, and the SwitchID fields of priority vectors for MCPC1, MCPC2 are updated to reflect this. In some cases, the root cost may also need to be updated depending on the topology. In the illustrated example, however, the root cost for MCPC1 and MCPC2 remains the same as S3 has a direct link to root node S1.

By allowing STP to run on MCPC topologies, embodiments of the present disclosure provide the advantages of both technologies. For example, the MCPC allows redundant switching paths between devices, while running STP provides optimum path selection, while avoiding loops.

While the foregoing is directed to embodiments of the present disclosure, other and further embodiments of the disclosure may be devised without departing from the basic scope thereof, and the scope thereof is determined by the claims that follow.

The invention claimed is:

1. A computer-implemented method to prevent spanning tree protocol operations from removing redundancy provided by a multi-chassis trunk (MCT), the method comprising:
   maintaining a multi-chassis port channel (MCPC) priority vector for a port of a first switch in a network topology, wherein the first switch is connected to a second switch in the network topology via an MCT to form an MCPC complex, and wherein the MCPC priority vector includes a switch identifier field, a designated switch identifier field, and at least one of a root identifier field and a cost field, wherein the switch identifier field is configured to store a value indicating whether the port is used to establish the MCT in the MCPC complex, wherein the MCPC complex is configured to:
      detect failure of the second switch by periodically synchronizing one or more parameters between the first switch and the second switch connected via the MCT; and
      upon detecting failure of the second switch, initiate a switchover operation to the first switch, such that the first switch serves as a redundant switch for the failed second switch;
   when performing the spanning tree protocol operations to remove one or more loops in the network topology, determining, based on the switch identifier field, whether the port is used to establish the MCT in the MCPC complex;
   upon determining that the port is used to establish the MCT in the MCPC complex:
      preventing the spanning tree protocol operations from blocking the port, to maintain redundancy provided by the MCT in the MCPC complex; and
      setting the value of the switch identifier field to a designated switch identifier value matching a value stored in the designated switch identifier field; and
   upon determining that the port is not used to establish the MCT in the MCPC complex:
      allowing the spanning tree protocol operations to block the port; and
      setting the value of the switch identifier field to a local switch identifier value identifying a switch to which the port belongs, wherein the local switch identifier value is different from the designated switch identifier value.

2. The method of claim 1, wherein performing spanning tree protocol operations comprises:
   sending BPDUs for a logical port of the MCPC complex on the same physical port of the first switch during normal operation.

3. The method of claim 2, further comprising:
sending BPDUs for the logical port of the MCPC complex on a physical port of the second switch if the physical port of the first switch, or a link established thereon, fails.

4. The method of claim 3, wherein sending BPDUs for the logical port of the MCPC complex on a physical port of the second switch comprises:
sending a BPDU from the first switch to the second switch, wherein the BPDU is sent in an encapsulated manner.

5. The method of claim 1, further comprising:
receiving a BPDU on a logical port of the MCPC complex and processing the BPDU with spanning tree protocol logic for the logical port.

6. The method of claim 5, wherein:
the BPDU is received on a physical port of the first switch, wherein the first switch does not have ownership of the MCPC complex; and
the first switch forwards the received BPDU to the second switch, wherein the second switch has ownership of the MCPC complex.

7. The method of claim 1, wherein the MCPC priority vector includes the root identifier field and the cost field, wherein the MCPC priority vector is included in a proposal message sent by the second switch on the port;
wherein the spanning tree protocol operations are configured to select the port as a root port in lieu of another port operatively connecting the at least one of the first switch and the second switch to a third switch, despite the port having a higher cost than the another port, in order to reach a converged state of the network topology, in which the port is not blocked and the another port is blocked.

8. The method of claim 7, wherein performing the spanning tree protocol operations comprises:
during operation of the MCPC complex in an absence of any link or switch failure, sending BPDUs for a logical port of the MCPC complex on the same physical port of the first switch, to allow a packet manager to retrieve a same selection hash value on a port channel for BPDU transmission when querying an interface database, wherein the packet manager is configured to support a predefined packet manager application programming interface (API) used by at least one of the first switch and the second switch for sending BPDUs;
upon determining that the physical port of the second switch, or a link established thereon, fails, sending BPDUs for the logical port of the MCPC complex on a physical port of the first switch; and
upon receiving a BPDU on a logical port of the MCPC complex, processing the received BPDU with spanning tree protocol logic for the logical port;
wherein at least one of the BPDUs is sent from the second switch to the first switch via the MCT, such that the at least one of the BPDUs is encapsulated in a predefined header and transmitted in accordance with a predefined internal protocol;
wherein the predefined header comprises a data bus (DBUS) header, wherein the predefined internal protocol comprises virtual switch link (VSL) inband protocol, wherein the DBUS header is configured to store a source index and a destination index, wherein the destination index is unique across all switches in the MCPC complex, wherein the DBUS header is present for communications via the MCT, and wherein the DBUS header is stripped for external communications not via the MCT; and wherein the BPDU is received on a physical port of the first switch, wherein the first switch does not have ownership of the MCPC complex, wherein the first switch forwards the received BPDU to the second switch, wherein the second switch has ownership of the MCPC complex, wherein each BPDU comprises a packet sent at configurable intervals to exchange information between switches in the network topology.

9. A switching device to prevent spanning tree protocol operations from removing redundancy provided by a multi-chassis trunk (MCT), the switching device comprising:
a first port for establishing an MCT with another switching device to form a multi-chassis port channel (MPCP) complex and for use in MCPC communications in a network topology, wherein the MCPC complex is configured to:
detect failure of the another switching device by periodically synchronizing one or more parameters between the switching device and the another switching device connected via the MCT; and
upon detecting failure of the another switching device, initiate a switchover operation to the switching device, such that the switching device serves as a redundant switch for the failed another switching device;
at least a second port for communicating with a device external to the MCPC complex;
logic for maintaining a multi-chassis port channel (MCPC) priority vector for a port of at least one of the switching device and the another switching device of the MCPC complex, wherein the MCPC priority vector includes a switch identifier field, a designated switch identifier field, and at least one of a root identifier field and a cost field, wherein the switch identifier field is configured to store a value indicating whether the port is used to establish the MCT in the MCPC complex;
logic for performing the spanning tree protocol operations to remove one or more loops in the network topology;
logic for, when performing the spanning tree protocol operations, determining, based on the switch identifier field, whether the port is used to establish the MCT in the MCPC complex;
logic for, upon determining that the port is used to establish the MCT in the MCPC complex:
preventing the spanning tree protocol operations from blocking the port, to maintain redundancy provided by the MCT in the MCPC complex; and
setting the value of the switch identifier field to a designated switch identifier value matching a value stored in the designated switch identifier field; and
logic for, upon determining that the port is not used to establish the MCT in the MCPC complex:
allowing the spanning tree protocol operations to block the port; and
setting the value of the switch identifier field to a local switch identifier value identifying a switch to which the port belongs, wherein the local switch identifier value is different from the designated switch identifier value.

10. The device of claim 9, wherein the logic for performing spanning tree protocol operations is configured to send BPDUs for a logical port of the MCPC complex on the same physical port of the switching device during normal operation.

11. The device of claim 9, wherein the logic for performing spanning tree protocol operations is configured to send BPDUs for the logical port of the MCPC complex on a physical port of a second switch if the physical port of the switching device, or a link established thereon, fails.

12. The device of claim 11, wherein the logic for performing spanning tree protocol operations is configured to send a BPDU from the switching device to the another switching device, wherein the BPDU is sent in an encapsulated manner.

13. The device of claim 9, wherein the logic for performing spanning tree protocol operations is configured to:
receive a BPDU on a logical port of the MCPC complex and processing the BPDU with spanning tree protocol logic for the logical port.

14. The device of claim 13, wherein:
the BPDU is received on a physical port of the switching device and the switching device does not have ownership of the MCPC complex; and
the switching device forwards the received BPDU to the another switch device via the MCT that has ownership of the MCPC complex.

15. A switching device to prevent spanning tree protocol operations from removing redundancy provided by a multi-chassis trunk (MCT), the switching device comprising:
at least a first port for establishing a multi-chassis trunk (MCT) with another switching device to form a multi-chassis port channel (MCPC) complex and for use in MCPC communications in a network topology, wherein the MCPC complex is configured to:
detect failure of the another switching device by periodically synchronizing one or more parameters between the switching device and the another switching device connected via the MCT; and
upon detecting failure of the another switching device, initiate a switchover operation to the switching device, such that the switching device serves as a redundant switch for the failed another switching device;
at least a second port for communicating with a device external to the MCPC complex;
means for maintaining a multi-chassis port channel (MCPC) priority vector for a port of at least one of the switching device and the another switching device of the MCPC complex, wherein the MCPC priority vector includes a switch identifier field, a designated switch identifier field, and at least one of a root identifier field and a cost field, wherein the switch identifier field is configured to store a value that is determined based on whether the port is used to establish a multi-chassis trunk (MCT) in the MCPC complex;
means for performing the spanning tree protocol operations to remove one or more loops in the network topology;
means for, when performing the spanning tree protocol operations, determining, based on the switch identifier field, whether the port is used to establish the MCT in the MCPC complex;
means for, upon determining that the port is used to establish the MCT in the MCPC complex:
preventing the spanning tree protocol operations from blocking the port, to maintain redundancy provided by the MCT in the MCPC complex; and
setting the value of the switch identifier field to a designated switch identifier value matching a value stored in the designated switch identifier field; and
means for, upon determining that the port is not used to establish the MCT in the MCPC complex:
allowing the spanning tree protocol operations to block the port; and
setting the value of the switch identifier field to a local switch identifier value identifying a switch to which the port belongs, wherein the local switch identifier value is different from the designated switch identifier value.

16. The device of claim 15, wherein the means for performing spanning tree protocol operations is configured to send BPDUs for the logical port of the MCPC complex on a physical port of the another switching device if the physical port of the switching device, or a link established thereon, fails.

17. The device of claim 16, wherein the means for performing spanning tree protocol operations is configured to send a BPDU from the switching device to the another switching device, wherein the BPDU is sent in an encapsulated manner.

* * * * *